US008857967B2

(12) United States Patent
Saito et al.

(10) Patent No.: US 8,857,967 B2
(45) Date of Patent: *Oct. 14, 2014

(54) SET OF INK AND REACTION LIQUID, AND IMAGE FORMING METHOD

(75) Inventors: Arihiro Saito, Saitama (JP); Mikio Sanada, Kawasaki (JP); Kenji Moribe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 13/443,191

(22) Filed: Apr. 10, 2012

(65) Prior Publication Data

US 2012/0268536 A1 Oct. 25, 2012

(30) Foreign Application Priority Data

Apr. 19, 2011 (JP) .................. 2011-093354
Mar. 29, 2012 (JP) .................. 2012-076528

(51) Int. Cl.
B41J 2/01 (2006.01)
C09D 11/40 (2014.01)
B41J 2/21 (2006.01)
C09D 11/322 (2014.01)
C09D 11/54 (2014.01)

(52) U.S. Cl.
CPC .............. *C09D 11/40* (2013.01); *B41J 2/2107* (2013.01); *B41J 2/01* (2013.01); *C09D 11/322* (2013.01); *C09D 11/54* (2013.01)
USPC ............................................. 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/322; C09D 11/328; C09D 11/101
USPC ............. 347/100, 95, 96, 101, 102, 20, 21, 9, 347/88, 99, 105; 106/31.6, 31.13, 31.27; 523/160, 161
See application file for complete search history.

(56) References Cited

U.S. PATENT DOCUMENTS

| | | | |
|---|---|---|---|
| 5,451,251 A | 9/1995 | Mafune et al. | |
| 5,571,313 A | 11/1996 | Mafune et al. | |
| 5,911,815 A | 6/1999 | Yamamoto et al. | |
| 6,027,210 A | 2/2000 | Kurabayashi et al. | |
| 6,062,674 A | 5/2000 | Inui et al. | |
| 6,174,354 B1 | 1/2001 | Takizawa et al. | |
| 6,221,141 B1 | 4/2001 | Takada et al. | |
| 6,280,513 B1 | 8/2001 | Osumi et al. | |
| 6,281,267 B2 | 8/2001 | Parazak | |
| 6,300,391 B2 | 10/2001 | Parazak et al. | |
| 6,332,919 B2 | 12/2001 | Osumi et al. | |
| 6,375,317 B1 | 4/2002 | Osumi et al. | |
| 6,425,662 B1 | 7/2002 | Teraoka et al. | |
| 6,511,534 B1 | 1/2003 | Mishina et al. | |
| 6,706,105 B2 | 3/2004 | Takada et al. | |
| 6,932,465 B2 | 8/2005 | Nito et al. | |
| 7,005,461 B2 | 2/2006 | Sanada et al. | |
| 7,160,376 B2 | 1/2007 | Watanabe et al. | |
| 7,276,110 B2 | 10/2007 | Tsujimura et al. | |
| 7,276,112 B2 | 10/2007 | Tokuda et al. | |
| 7,347,890 B2 | 3/2008 | Nito et al. | |
| 7,371,274 B2 | 5/2008 | Sanada et al. | |
| 7,402,200 B2 | 7/2008 | Imai et al. | |
| 7,605,192 B2 | 10/2009 | Sanada et al. | |
| 7,635,182 B2 | 12/2009 | Hakamada et al. | |
| 7,682,433 B2 | 3/2010 | Yanagimachi et al. | |
| 7,695,099 B2 | 4/2010 | Sanada et al. | |
| 7,699,924 B2 | 4/2010 | Mafune et al. | |
| 7,753,515 B2 | 7/2010 | Tokuda et al. | |
| 7,846,247 B2 | 12/2010 | Mizutani et al. | |
| 7,862,653 B2 | 1/2011 | Sanada et al. | |
| 7,878,643 B2 | 2/2011 | Kudo et al. | |
| 7,947,762 B2 | 5/2011 | Udagawa et al. | |
| 7,988,277 B2 | 8/2011 | Moribe et al. | |
| 8,007,097 B2 | 8/2011 | Sanada et al. | |
| 8,016,406 B2 | 9/2011 | Hakamada et al. | |
| 8,016,932 B2 | 9/2011 | Okamura et al. | |
| 8,217,097 B2 | 7/2012 | Udagawa et al. | |
| 8,273,168 B2 | 9/2012 | Kakikawa et al. | |
| 2001/0008908 A1 | 7/2001 | Parazak | |
| 2001/0018472 A1 | 8/2001 | Parazak et al. | |
| 2004/0104986 A1* | 6/2004 | Nito et al. ........................ 347/96 |
| 2004/0201658 A1* | 10/2004 | Jackson et al. ................ 347/100 |
| 2006/0023044 A1* | 2/2006 | Bauer .......................... 347/100 |
| 2006/0092251 A1* | 5/2006 | Prasad et al. .................. 347/100 |
| 2006/0197814 A1 | 9/2006 | Doi | |
| 2007/0097155 A1 | 5/2007 | Imai et al. | |
| 2007/0112095 A1 | 5/2007 | Moribe et al. | |
| 2007/0229636 A1* | 10/2007 | Mubarekyan et al. ........ 347/100 |
| 2008/0257203 A1* | 10/2008 | Choy et al. .................. 106/31.13 |
| 2009/0295893 A1* | 12/2009 | Akiyama et al. ................ 347/96 |
| 2010/0236447 A1* | 9/2010 | Sakai .......................... 106/31.6 |
| 2011/0141190 A1 | 6/2011 | Moribe et al. | |
| 2011/0277663 A1 | 11/2011 | Sanada et al. | |

FOREIGN PATENT DOCUMENTS

| | | | | |
|---|---|---|---|---|
| CN | 1493465 A | 5/2004 | | |
| CN | 101838485 A | 9/2010 | | |
| EP | 2233634 A1 * | 9/2010 | ................ | B41J 2/01 |
| JP | 2000-129184 A | 5/2000 | | |

(Continued)

OTHER PUBLICATIONS

U.S. Appl. No. 13/442,359, filed Apr. 9, 2012, Saito et al.

(Continued)

*Primary Examiner* — Manish S Shah
(74) *Attorney, Agent, or Firm* — Fitzpatrick, Cella, Harper & Scinto

(57) ABSTRACT

A set of an ink containing a self-dispersible pigment and a water-soluble resin, which is a copolymer having a unit derived from (meth)acrylic acid, and a reaction liquid containing a surfactant, which is an ethylene oxide adduct of a higher alcohol of a linear primary or secondary alcohol or an isoalkyl alcohol and has a HLB value of 13.0 or more determined by the Griffin method, and having buffering ability in an acid region. Content of the surfactant in the reaction liquid is 0.20 times or more in terms of mass ratio as much as total content of the pigment and water-soluble resin.

12 Claims, No Drawings

(56) References Cited

FOREIGN PATENT DOCUMENTS

JP    2008-308662 A    12/2008
WO    2005/044574 A1    5/2005

OTHER PUBLICATIONS

U.S. Appl. No. 13/440,342, filed Apr. 5, 2012, Moribe et al.

Oct. 11, 2012 European Search Report in European Patent Appln. No. 12002473.2.

Chinese Office Action dated Mar. 3, 2014, issued in counterpart Chinese Application No. 201210116940.8, and English-language translation thereof.

* cited by examiner

SET OF INK AND REACTION LIQUID, AND IMAGE FORMING METHOD

BACKGROUND OF THE INVENTION

1. Field of the Invention

The present invention relates to a set of an ink and a reaction liquid, and an image forming method.

2. Description of the Related Art

A method for forming an image by providing another liquid for making the image good than an ink containing a coloring material as what is called a reaction liquid and applying the reaction liquid and the ink to a recording medium has heretofore been variously proposed as an ink jet recording method. According to this method, aggregation of the coloring material in the recording medium is accelerated by the reaction liquid, whereby the performance of the image can be improved compared with a method for forming an image with an ink alone.

For example, there has been a proposal for controlling an ink and a reaction liquid so as to slow the speeds of penetration and diffusion thereof into a recording medium, not by improving the reactivity between them, thereby achieving a high optical density (see Japanese Patent Application Laid-Open No. 2008-308662). Specifically, a reaction liquid whose dynamic surface tension at a lifetime of 30 milliseconds is 41 mN/m or more and an ink whose static surface tension is high to some extent are used, thereby ensuring a time period during which a coloring material aggregates on the surface of the recording medium to improve the optical density. On the other hand, there has been a proposal that a first ink containing a pH-sensitive resin are brought into contact with a second ink having a predetermined pH to insolubilize the pH-sensitive resin, thereby suppressing the feathering of an image (see Japanese Patent Application Laid-Open No. 2000-129184).

SUMMARY OF THE INVENTION

However, when the reaction liquid is applied to the recording medium from a recording head of an ink jet system in the method of forming the image by applying the reaction liquid and the ink to the recording medium as described above, there is a possibility of causing the following problem. That is, when rebounding of a droplet occurs when the reaction liquid or the ink is applied to the recording medium, the reaction liquid is mixed with the ink at a surface where an ejection orifice has been formed in the recording head (hereinafter referred to as an ejection orifice surface), and the rebounding of the droplet is received. In order to achieve an excellent optical density, it is effective to enhance the reactivity between the reaction liquid and the ink. In this case, however, the reaction liquid and the ink that have been mixed at the ejection orifice surface of the recording head come to strongly react to each other. As a result, an unremovable firm sticking matter comes to occur on the ejection orifice surface even when a suction recovery operation generally adopted in the ink jet recording apparatus for keeping the ejection orifice surface of the recording head clean is conducted.

Accordingly, it is an object of the present invention to provide a set of an ink and a reaction liquid, by which an excellent optical density is achieved, and sticking on an ejection orifice surface of a recording head can be suppressed. Another object of the present invention is to provide an image forming method, by which the excellent image described above is obtained, and sticking on an ejection orifice surface of a recording head can be suppressed.

The above objects can be achieved by the present invention described below. That is, the present invention provides a set of an ink jet ink and a reaction liquid, the set having a combination of an ink containing a pigment and a water-soluble resin and a reaction liquid containing no coloring material but containing a surfactant and having buffering ability in an acid region, wherein the pigment in the ink contains a self-dispersible pigment to a particle surface of which an anionic group is bonded directly or through another atomic group, the weight-average molecular weight of a functional group bonded to the surface of the pigment particle is 1,000 or less, the water-soluble resin contains a copolymer having a unit derived from (meth)acrylic acid, the surfactant in the reaction liquid contains an ethylene oxide adduct of a higher alcohol selected from the group consisting of a linear primary alcohol, a linear secondary alcohol and an isoalkyl alcohol and has a HLB value of 13.0 or more as determined by the Griffin method, and the content (% by mass) of the surfactant in the reaction liquid is 0.20 times or more in terms of mass ratio as much as the total content (% by mass) of the pigment and the water-soluble resin in the ink.

According to the present invention, there can be provide a set by which an excellent optical density is achieved and sticking on an ejection orifice surface of a recording head can be suppressed. According to the present invention, there can also be provided an image forming method that can adapt to high speed recording, obtain the above-described excellent image and suppress sticking on an ejection orifice surface of a recording head.

Further features of the present invention will become apparent from the following description of exemplary embodiments.

DESCRIPTION OF THE EMBODIMENTS

Preferred embodiments of the present invention will now be described in detail. Incidentally, various physical properties such as viscosity, surface tension, pH and pKa in the present invention are values at 25° C. In the present invention, the feature that the reaction liquid "has buffering ability in an acid region" means that the pH of a mixture of the reaction liquid and an ink used in a set therewith is kept within a range less than 7.0 substantially without changing from the pH of the reaction liquid. More specifically, this means that a difference between the pH (less than 7.0) of the reaction liquid and the pH of an equiamount mixture of the ink and the reaction liquid is within 0.1. In addition, "pKa" defined in the present invention is an index for quantitatively indicating the strength of an acid and is also called an acid dissociation constant or an acidity constant. It is represented by a negative common logarithm pKa in view of a dissociation reaction to release a hydrogen ion from an acid. Accordingly, the smaller pKa indicates that such an acid is stronger.

First, methods for achieving excellent optical density on a recording medium, in particular, plain paper, among the objects of the present invention include a method of slowing the speeds of penetration and diffusion of an ink into a recording medium as described above. However, this method is hard to adapt to high speed recording because a time required for drying of the ink is liable to be long. Thus, the present inventors have considered that it is useful to enhance the reactivity between a reaction liquid and an ink for achieving a high optical density while being capable of adapting to high speed recording, and investigated a method for it.

In that case, it is necessary to newly establish a technique for suppressing the sticking on the ejection orifice surface of the recording head for the objects of the present invention. Thus, the present inventors have investigated what substance is useful as a substance for markedly lowering the reactivity between the reaction liquid and the ink, i.e., a reaction inhibitor. Specifically, various water-soluble organic solvents and surfactants have been combined with various pigments and reaction agents to investigate the reactivities thereof, thereby finding a substance effectively functioning as a reaction inhibitor in some combinations.

Specifically, the following has been found. In a system excluding a reaction inhibitor, i.e., a combination of a pigment and a reaction agent, the dispersed state of the pigment is effectively destabilized to form an aggregate of the pigment. On the contrary, it has been found that in such a system that a reaction inhibitor is combined in that system, the destabilization of the dispersed state of the pigment is suppressed, and the formation of the aggregate is also suppressed. Thus, the present inventors have paid particular attention to a combination of an ink and a reaction liquid which respectively contain the following components among such combinations to conduct the investigation repeatedly. First, a self-dispersible pigment and a copolymer having a unit derived from (meth)acrylic acid (hereinafter may be referred to as a water-soluble resin) are contained in the ink. And the reaction liquid is caused to have buffering ability in an acid region, and a polyoxyethylene alkyl ether (nonionic surfactant) as a reaction inhibitor is contained in the reaction liquid. Since this reaction liquid has the buffering ability in the acid region, a reaction agent reacting with a group of a dissociated form (an anionic group of the self-dispersible pigment or the acidic group of the water-soluble resin) is a proton (H).

The reaction of the ink containing the pigment with the reaction liquid having the buffering ability in the acid region has heretofore been utilized. In addition, some nonionic surfactant is also known to contribute to the dispersion stabilization of a pigment. The present inventors have pursued the above-described techniques and carried out an investigation with a view toward achieving both excellent optical density and suppression of sticking on the ejection orifice surface of the recording head at a high level. First, the destabilization of a dispersed state of a self-dispersible pigment when an ink containing the pigment and a water-soluble resin is mixed with a reaction liquid having buffering ability in an acid region and the stabilization of a dispersed state of the pigment and a dissolved state of the water-soluble resin by a nonionic surfactant have been analyzed in more detail. As a result, the following have been found.

First, the former reaction, i.e., the destabilization of the dispersed state of the pigment is described. It is difficult to achieve a high optical density by using an ink containing a self-dispersible pigment as a coloring material when a reaction liquid having buffering ability in an acid region is utilized. This is attributable to the fact that the anionic group bonded to the particle surface is in a dissociated form (anionic form), and the dispersed state of the pigment is kept stable by an electrical double layer formed thereby. The ratio of the dissociated form anionic group which changes to the acid form to that which remains in the dissociated form after the ink comes into contact with the reaction liquid is determined by the relationship between the pH of the reaction liquid and the pKa of the anionic group. When the pH of the reaction liquid is sufficiently lower than the pKa of the anionic group, specifically lower by about 2 or more, almost all the anionic group, specifically 99% or more thereof, can be changed to the acid form, the dispersed state of the pigment is destabilized, and a large aggregate is formed. When the pH of the reaction liquid is not low to the above-described extent compared with the pKa of the anionic group to the contrary, the anionic group is present as the dissociated form at a certain proportion. In such a case, the anionic group of the dissociated form bonded to the surface of the pigment particle lessens, so that the dispersion stability of the pigment is lowered. However, a large aggregate is not formed because the electrical double layer is still formed.

Examples of the anionic group bonded directly or through another atomic group to the surface of the pigment particle include a carboxy group, a sulfonic group, a phosphate group and a phosphonic group. In order to provide a reaction liquid having a pH lower by about 2 or more than the pKa of such an anionic group, it is necessary to cause the reaction liquid to have buffering ability in a pH region lower by about 2 to 3 than the pKa. Taking corrosion of a member constituting a recording apparatus into consideration, it is difficult to utilize the reaction liquid having buffering ability in such a pH region.

Thus, the present inventors have carried out a further investigation. As a result, it has been found that when a specific water-soluble resin is further added to an ink containing a self-dispersible pigment when the reaction liquid having buffering ability in the acid region is utilized, behavior different from the above is caused to achieve an excellent optical density. In the present invention, a copolymer having a unit derived from (meth)acrylic acid is used as the water-soluble resin. The unit derived from (meth)acrylic acid in this water-soluble resin has a carboxy group which becomes a dissociated form in the ink, and this resin is dissolved in water by such carboxy group which forms a hydrogen bond together with water.

The ratio of the carboxy group of the water-soluble resin which becomes an acid form to that which remains in a dissociated form after the ink is mixed with the reaction liquid is determined by the relationship between the pH of the reaction liquid and the pKa of the carboxy group that is an anionic group, like the case described above. However, there is no need to change almost all the anionic group to the acid form for insolubilizing the water-soluble resin. It is only necessary to rather reduce the amount of the carboxy group of the dissociated form than the amount of the carboxy group of the dissociated form which is required to dissolve the resin in water. Specifically, the resin can be insolubilized by controlling the acid value in view of the carboxy group alone of the dissociated form to about 60 to 80 mg KOH/g or less though it depends on the constitution of a water-soluble organic solvent other than water used in the ink. When the resin insolubilized in such a manner coexists with the self-dispersible pigment whose dispersed state has been destabilized, a large aggregate of the resin and the pigment is formed by collision between them. In the present invention, an excellent optical density can be achieved by such a mechanism.

Then, the latter reaction, i.e., the stabilization of the pigment and the water-soluble resin by the nonionic surfactant, is caused in the following manner. In the ink containing the nonionic surfactant, the self-dispersible pigment and the water-soluble resin, the nonionic surfactant is oriented to the surface of pigment particles and a hydrophobic portion of the water-soluble resin, and the dispersed state of the pigment and the dissolved state of the water-soluble resin are kept stable by the water-solubility of that nonionic surfactant. Since the nonionic surfactant is dissolved in water by forming a hydrogen bond with water by a hydrophilic portion thereof, the nonionic surfactant is hard to be affected by pH change. In other words, the stabilization of the pigment and the water-soluble resin by the nonionic surfactant is made by its interaction with the pigment and the water-soluble resin.

Then, the present inventors have carried out an investigation about the time when the above-described two actions occur when three liquids of an aqueous dispersion liquid containing the self-dispersible pigment and the water-soluble resin, an aqueous solution having buffering ability in an acid region and an aqueous solution of the nonionic surfactant are mixed. As a result, it has been found that the destabilization of the dispersed state of the pigment and the insolubilization of the water-soluble resin by lowering of the pH are first caused, and the stabilization of the pigment and the water-soluble resin by the nonionic surfactant is then caused.

The present inventors understand this phenomenon to be as follows. First, the condition that the nonionic surfactant is present in the aqueous solution in a state of forming micelles holds the key, thereby determining the time when the above-mentioned two actions occur. When such three liquids are mixed, the anionic group of the self-dispersible pigment and the acidic group of the water-soluble resin rapidly reach a dissociation rate determined by acid dissociation equilibrium according to the pKa values of these groups and the pH of the mixture. An aggregate of the self-dispersible pigment and the water-soluble resin is then formed by the mechanism described above. On the other hand, the nonionic surfactant stabilizes the dispersed state of the pigment and the dissolved state of the water-soluble resin when the micelle structure formed by an interaction between hydrophobic portions is destroyed once, and the hydrophobic portions then interact with the surface of the pigment particle and a hydrophobic portion of the water-soluble resin. The time when the above-described two actions occur is considered to be varied from such reasons.

Taking into account understanding of these phenomena, the present inventors have investigated a method for suppressing the sticking on the ejection orifice surface of the recording head to lead to completion of the present invention. Specifically, a reaction liquid and an ink of the following respective constitutions are combined to provide a set. That is, the reaction liquid is caused to have buffering ability in an acid region, and a nonionic surfactant is further contained as a reaction inhibitor therein. A coloring material and a self-dispersible pigment are used in the ink, and a water-soluble resin that is a copolymer having a unit derived from (meth)acrylic acid is further contained therein. This constitution has been able to be reached through deep understanding as to the interactions respectively exerted by the self-dispersible pigment, the water-soluble resin, the reaction liquid having the buffering ability in the acid region and the nonionic surfactant as well as the time when these interactions occur. By taking this constitution, a high optical density can be achieved, and the sticking on the ejection orifice surface of the recording head can be suppressed. The present inventors guess the mechanism that such effects are achieved to be as follows.

First, a phenomenon caused when the reaction liquid and ink of the above-described constitution are mixed on the recording medium is described. In this case, the reaction liquid having the buffering ability in the acid region destabilizes the dispersed state of the self-dispersible pigment in the ink and insolubilizes the water-soluble resin. A large aggregate is formed by collision of these. On the other hand, other water-soluble components (including the nonionic surfactant derived from the reaction liquid) rapidly penetrate and diffuse into a recording medium, so that the stabilization of the pigment and the water-soluble resin by the nonionic surfactant does not occur. In this manner, when the reaction liquid and the ink are applied to a recording medium, a high optical density is achieved which is comparable to that in the case where no reaction inhibitor is present.

Then, a phenomenon caused when the reaction liquid and ink of the above-described constitution are mixed on an ejection orifice surface of a recording head is described. In this case, the reaction liquid having the buffering ability in the acid region first destabilizes the dispersed state of the self-dispersible pigment contained in the ink like the case on the recording medium, and the water-soluble resin is also insolubilized. However, a phenomenon caused thereafter is different from the case on the recording medium, and the stabilization of the pigment and the resin by the nonionic surfactant occurs because other water-soluble components (including the nonionic surfactant derived from the reaction liquid) are present together with the self-dispersible pigment whose dispersed state has been destabilized and the insolubilized matter of the resin. In this manner, the sticking on the ejection orifice surface of the recording head is suppressed.

In order to confirm the phenomenon caused on the ejection orifice surface of the recording head in particular of the above-described mechanism, the present inventors have made an evaluation with the dispersing method of the pigment and the reaction agent changed as follows. Specifically, an evaluation has been carried out on a combination of an ink containing a resin-dispersed pigment and a reaction liquid having buffering ability in an acid region and a combination of an ink containing a self-dispersible pigment and a water-soluble resin and a reaction liquid containing a polyvalent metal ion. However, even in any case thereof, the sticking on the ejection orifice surface of the recording head has been unable to be suppressed.

First, the combination of the ink containing the resin-dispersed pigment and the reaction liquid having the buffering ability in the acid region is considered. In the resin-dispersed pigment, the dispersed state of the pigment is kept stable by steric repulsion of a water-soluble resin adsorbed on the particle surface thereof. When the reaction liquid is mixed with the ink containing this resin-dispersed pigment, the pH of the mixture becomes an acid region, and most of the acidic group of the water-soluble resin adsorbed on the surface of the pigment particle changes from an associated form to an acid form, so that the resin is rapidly insolubilized. The steric repulsion by which the pigment has been dispersed is thereby weakened to destabilize the dispersed state of the pigment. At this time, the insolubilization of the water-soluble resin is caused to almost completely proceed because the reaction liquid has the buffering ability, so that an aggregate of the pigment becomes large. If the nonionic surfactant is present in this case, the dispersed state cannot be stabilized because the aggregate is large. It is thus considered that the sticking on the ejection orifice surface of the recording head has been unable to be suppressed.

Then, the combination of the ink containing the self-dispersible pigment and the water-soluble resin and the reaction liquid containing the polyvalent metal ion is considered. In the self-dispersible pigment, the acidic group bonded to the surface of the pigment particle becomes an anionic form, and so the dispersed state of the pigment is kept stable by an electrical double layer formed thereby. When the polyvalent metal ion is mixed with the ink containing this self-dispersible pigment, the electrical double layer is rapidly compressed, and the dispersed state of the pigment is destabilized. Since this reaction is caused to quickly proceed, an aggregate of the pigment becomes large. If the nonionic surfactant is present in this case, the dispersed state cannot be stabilized because the aggregate is large. It is thus considered that the sticking on the ejection orifice surface of the recording head has been unable to be suppressed.

As described above, the combination of the ink containing the self-dispersible pigment and the water-soluble resin and the reaction liquid having the buffering ability in the acid region and containing the nonionic surfactant is effective to improve the optical density of an image and suppress the sticking on the ejection orifice surface of the recording head. Requirements of the respective components necessary for achieving these effects will hereinafter be described.

The requirements of the nonionic surfactant necessary for suppressing the sticking on the ejection orifice surface of the recording head are first described. According to the mechanism described above, the following points become important. That is, the structure of the hydrophobic portion for interacting with the surface of the pigment particle and the insolubilized matter of the resin, the hydrophilicity of the surfactant for causing those interacted to be stably present and further the content for stabilizing the pigment and water-soluble resin in the ink become important. The present inventors have investigated these requirements in more detail, thereby ascertain that the following requirements are necessary for suppressing the sticking on the ejection orifice surface of the recording head. In the present invention, the nonionic surfactant acting as the reaction inhibitor is contained in the reaction liquid. The nonionic surfactant is required to be an ethylene oxide adduct of a higher alcohol selected from the group consisting of a linear primary alcohol, a linear secondary alcohol and an isoalkyl alcohol and have an HLB value of 13.0 or more as determined by the Griffin method.

On the other hand, in the case of such a structure that an alkyl chain that is a hydrophobic portion of a nonionic surfactant is branched at a plurality of portions, such a nonionic surfactant is hard to interact with the surface of the pigment particle or the insolubilized matter of the resin by its steric hindrance. When that having an HLB value less than 13.0 is used as the ethylene oxide adduct of the higher alcohol, such a nonionic surfactant is low in hydrophilicity, and thus cannot stabilize the pigment and the water-soluble resin.

According to the investigation by the present inventors, it is necessary to set the amount of the nonionic surfactant sufficient with respect to the amounts of the pigment and the water-soluble resin for stabilizing the pigment and the water-soluble resin in the ink by the nonionic surfactant constituting the reaction liquid. Thus, the content (% by mass) of the nonionic surfactant in the reaction liquid is required to be 0.20 times or more in terms of mass ratio as much as the total content (% by mass) of the pigment and the water-soluble resin in the ink. If the mass ratio is less than 0.20 times, the sticking on the ejection orifice surface of the recording head cannot be suppressed.

In addition, the weight-average molecular weight of a functional group (an anionic group when the anionic group is directly bonded, or another atomic group and an anionic group when the anionic group is bonded through said another atomic group) bonded to the surface of the pigment particle is required to be 1,000 or less. A functional group having a weight-average molecular weight of more than 1,000 is liable to have an action like a resin, and the dispersion of the pigment comes to be made by the steric repulsion thereof to exhibit the same behavior as the resin-dispersed pigment. In this case, as described above, the steric repulsion by which the pigment has been dispersed is weakened by rapid insolubilization of the functional group when the self-dispersible pigment is mixed with the reaction liquid having the buffering ability in the acid region, and a large aggregate is formed. If the nonionic surfactant is present in this case, the dispersed state cannot be stabilized because the aggregate is large, and the sticking on the ejection orifice surface of the recording head cannot be suppressed.

Set of Ink and Reaction Liquid:

The ink and the reaction liquid constituting the set according to the present invention will now be respectively described in detail.

Reaction Liquid:

The reaction liquid constituting the set according to the present invention contains the specific surfactant acting as the reaction inhibitor and having the buffering ability in the acid region and reacts with the ink used in combination. Incidentally, the reaction between the reaction liquid and the ink in the present invention is caused by acid precipitation of the water-soluble resin that is a copolymer having a unit derived from (meth)acrylic acid in the ink due to the buffering ability of the reaction liquid in the acid region. Since the reaction liquid is used in combination with the ink when an image is formed, the reaction liquid is required to contain no coloring material and is favorably colorless without exhibiting absorption in a visible region in view of an influence on the image. However, the reaction liquid may be of a light color exhibiting absorption in the visible region so far as no influence is exerted on an actual image even if it exhibits absorption in the visible region. The respective components constituting the reaction liquid will now be described by mentioning specific examples thereof.

Organic Acid:

The reaction liquid used in the present invention is required to have buffering ability in an acid region, i.e., a pH region less than 7.0. In order to provide the reaction liquid having pH buffering ability in the acid region, it is favorable to contain a buffer in the reaction liquid. As the buffer, any conventionally known compound capable of bringing buffering ability to pH change may be used in the present invention so far as it is a substance capable of imparting buffering ability in the acid region to the reaction liquid by adding it. The content (% by mass) of the buffer in the reaction liquid may be arbitrary so far as the resultant reaction liquid comes to satisfactorily have the buffering ability defined in the present invention, and is, for example, 1.0% by mass or more and 15.0% by mass or less based on the total mass of the reaction liquid.

According to an investigation by the present inventors, an organic acid that is a weak acid is favorably used as the buffer contained in the reaction liquid for bringing the buffering ability in the acid region taking the reactivity when the ink comes into contact with the reaction liquid on a recording medium into consideration. Specific examples of such an organic acid include organic acids having a carboxy group. Since an organic acid having a carboxy group is generally a weak acid, an acid dissociation constant (pKa) can be used as a measure indicating the strength of the acid. The pKa of the organic acid having a carboxy group is particularly favorably 2.5 or more and 6.5 or less in water of 25° C. from the viewpoint of effectively improving the reactivity. If the pKa is less than 2.5, the acidity is too strong, and it may be liable in some cases to cause corrosion against a member constituting a recording apparatus. If the pKa is more than 6.5 on the other hand, the acidity is too weak, and the water-soluble resin cannot be sufficiently insolubilized, so that a high optical density may not be sufficiently achieve in some cases. Incidentally, a divalent or still higher polyvalent carboxylic acid exhibits ionic dissociation of plural stages according to the carboxy groups of the valence thereof. However, pKas of all the stages are favorably included in the above range.

In order to cause the reaction liquid to have the buffering ability in the present invention, such an organic acid having a carboxy group as specifically mentioned below is favorably contained as a buffer. Examples of the organic acid include salts of monocarboxylic acids such as formic acid, acetic acid, propionic acid and butyric acid; salts and hydrogen salts of dicarboxylic acids such as phthalic acid, isophthalic acid, terephthalic acid, oxalic acid, malonic acid, succinic acid, glutaric acid, adipic acid, maleic acid, fumaric acid, itaconic acid, sebacic acid, dimer acid, pyromellitic acid and trimellitic acid; salts and hydrogen salts of tricarboxylic acids such as citric acid; and salts of hydroxycarboxylic acids such as oxysuccinic acid, DL-malic acid and tartaric acid. Examples of a cation forming the salt include ions of alkali metals such as lithium, sodium and potassium.

Among these, a buffer having high solubility in water is favorably used. Examples of such a buffer include monocarboxylic acid salts such as acetic acid salts and propionic acid salts, salts and hydrogen salts of polycarboxylic acids such as malonic acid, succinic acid, glutaric acid and citric acid, and salts of hydroxycarboxylic acids such as malic acid and tartaric acid. In addition, an organic acid (dicarboxylic acid or a salt thereof) having two carboxy groups is favorably used. The reason for this is as follows. The buffering ability in the acid region becomes stronger by using the dicarboxylic acid, so that the destabilization of the dispersed state of the self-dispersible pigment and the insolubilization of the resin are easy to occur, whereby a higher optical density can be achieved. However, when the number of carboxy groups in a molecule increases, the reactivity with the ink becomes higher, but the solubility in water becomes low like citric acid. Accordingly, the organic acid having two carboxy groups is favorably used in the present invention.

As a result of an investigation by the present inventors, it has been found that it is favorable that the reaction liquid contains an organic acid having a carboxy group, and the pH of the reaction liquid is 3.5 or more and 5.5 or less. If the pH of the reaction liquid is too low, it may be liable in some cases to cause corrosion against a member constituting a recording apparatus, so that the pH is favorably 3.5 or more. When the pH of the reaction liquid is 5.5 or less on the other hand, the water-soluble resin in the ink can be rapidly insolubilized to achieve a higher optical density. In order to control the reaction liquid so as to have a pH of 3.5 or more and 5.5 or less, it is favorable to contain a pH adjustor such as an organic acid such as acetic acid or methanesulfonic acid, an inorganic acid such as sulfuric acid or nitric acid, or a base such as a hydroxide of an alkali metal.

In order to effectively insolubilize the resin in the ink by the organic acid, it is favorable that the number of acidic groups in the acid form (H form) of the organic acid is sufficient to the number of carboxy groups of the water-soluble resin. Thus, it is favorable that the organic acid has an acidic group of an acid form, and the amount (µmol/g) of the acidic group of the acid form is 8.0 times or more in terms of molar ratio as much as the amount (µmol/g) of the carboxy groups of the water-soluble resin in the ink. When the molar ratio is 8.0 times or more, a higher optical density can be achieved. The molar ratio is favorably 100.0 times or less, more favorably 50.0 times or less, particularly favorably 30.0 times or less.

Surfactant:

The reaction liquid constituting the set according to the present invention contains an ethylene oxide adduct of a higher alcohol selected from the group consisting of a linear primary alcohol, a linear secondary alcohol and an isoalkyl alcohol and have an HLB value of 13.0 or more. Favorable specific examples of the higher alcohol include capryl alcohol, lauryl alcohol, secondary tridecyl alcohol, myristyl alcohol, cetyl alcohol, isocetyl alcohol, palmitoyl alcohol, stearyl alcohol, isostearyl alcohol, oleyl alcohol, linoleyl alcohol and behenyl alcohol.

In the present invention, the number of carbon atoms of the higher alcohol is favorably 16 or more. By using a surfactant formed of such a higher alcohol, the interaction with the surface of the pigment particle and the hydrophobic portion of the water-soluble resin can be more strongly exhibited to suppress the sticking on the ejection orifice surface of the recording head at a higher level. The number of carbon atoms of the higher alcohol is favorably 22 or less. If the number of carbon atoms is more than 22, the hydrophobicity of the surfactant becomes too strong, and difficulty may be encountered in some cases on causing the surfactant to be stably present in the ink. In addition, the surfactant may also adhere to the ejection orifice surface of the recording head in some cases. In the present invention, the number of ethylene oxide groups added is favorably 10 or more and 50 or less, more favorably 10 or more and 30 or less.

In the reaction liquid constituting the set according to the present invention, the content (% by mass) of the surfactant in the reaction liquid is required to be 0.20 times or more in terms of mass ratio as much as the total content (% by mass) of the pigment and the water-soluble resin in the ink. Since the ejection of the reaction liquid may become unstable in some cases, the mass ratio is favorably 1.00 time or less, more favorably 0.70 times or less, particularly favorably 0.50 times or less though it varies according to the structure and HLB value of the surfactant. Incidentally, the content of the non-ionic surfactant when this mass ratio is calculated is a value based on the total mass of the reaction liquid, and both of the contents of the pigment and the water-soluble resin are values based on the total mass of the ink. When plural pigments and water-soluble resins are present in the ink, the contents thereof are calculated as the total amount thereof.

The content (% by mass) of the surfactant in the reaction liquid is favorably 0.10% by mass or more and 3.5% by mass or less, more favorably 0.60% by mass or more and 2.5% by mass or less based on the total mass of the reaction liquid though it varies according to the structure and HLB value of the surfactant. Incidentally, when two or more surfactants satisfying the requirement defined in the present invention are used, the content of the surfactant is the total content thereof.

The ethylene oxide adduct of the higher alcohol used in the reaction liquid constituting the set according to the present invention is required to have an HLB value of 13.0 or more as determined by the Griffin method. Incidentally, the upper limit of the HLB value is 20.0 as described below. Thus, the upper limit of the HLB value of the ethylene oxide adduct of the higher alcohol used in the present invention is also 20.0 or less.

The Griffin method utilized for defining the HLB value of the surfactant in the present invention is described. The HLB value by the Griffin method is determined according to the following equation (1) from the formula weight of a hydrophilic group of a surfactant and the molecular weight of the surfactant and indicates the degree of hydrophilicity or lipophilicity of the surfactant in a range of from 0.0 to 20.0. The lower the HLB value, the higher the lipophilicity, i.e., the hydrophobicity of the surfactant. On the other hand, the higher the HLB value, the higher the hydrophilicity of the surfactant.

HLB value=20×(Formula weight of the hydrophilic group of the surfactant)/(Molecular weight of the surfactant).     Equation 1

In the present invention, a publicly known surfactant generally used in a reaction liquid for ink jet may be further contained in addition to the specific surfactant so far as the effects of the present invention are not prevented. Specific examples thereof include other nonionic surfactants than those described above, such as polyoxyethylene alkyl ethers, acetylene glycol compounds, ethylene oxide adducts of acetylene glycol and polyoxyethylene-polyoxypropylene block copolymers, anionic surfactants, cationic surfactants, amphoteric surfactants such as betaine compounds, and surfactants such as fluorine compounds and silicone compounds.

Aqueous Medium:

Water or a mixed solvent of water and a water-soluble organic solvent is favorably contained as an aqueous medium in the reaction liquid constituting the set according to the present invention. Deionized water or ion-exchanged water is favorably used as water. In the present invention, an aqueous reaction liquid containing at least water as the aqueous medium is particularly favorably provided. The content (% by mass) of water in the reaction liquid is favorably 25.0% by mass or more and 95.0% by mass or less, more favorably 50.0% by mass or more and 95.0% by mass or less, based on the total mass of the reaction liquid. All of publicly known water-soluble organic solvents generally used in a reaction liquid for ink jet may be used as the water-soluble organic solvent. One or more water-soluble organic solvents may be used. Specific examples thereof include monohydric or polyhydric alcohols, alkylene glycols the alkylene group of which has about 1 to carbon atoms, polyethylene glycols having an average molecular weight of about 200 to 2,000, glycol ethers and nitrogen-containing compounds. The content (% by mass) of the water-soluble organic solvent in the reaction liquid is favorably 3.0% by mass or more and 70.0% by mass or less, more favorably 3.0% by mass or more and 50.0% by mass or less based on the total mass of the reaction liquid.

Other Components:

In addition to the above-described components, an organic compound that is solid at ordinary temperature, for example, a nitrogen-containing compound such as urea or ethyleneurea, and trimethylolethane or trimethylolpropane, may also be contained in the reaction liquid constituting the set according to the present invention as needed. In addition to the above-described components, various additives such as a polymer compound, a pH adjustor, an antifoaming agent, a rust preventive, a preservative, a mildewproofing agent, an antioxidant, an anti-reducing agent, an evaporation accelerator and a chelating agent may also be further contained in the reaction liquid as needed.

Ink:

The ink constituting the set according to the present invention contains a pigment as a coloring material, the pigment is a self-dispersible pigment, and the ink further contains a water-soluble resin that is a copolymer having a unit derived from (meth)acrylic acid. No particular limitation is imposed on the hue of the ink, and the ink may be provided as a cyan, magenta, yellow, black, red, blue or green ink. The respective components constituting the ink will now be described.

Pigment:

The ink constituting the set according to the present invention contains a pigment as a coloring material. No particular limitation is imposed on the kind of the pigment usable in the present invention, and all of publicly known inorganic pigments and organic pigments may be used. Specific examples thereof include inorganic pigments such as calcium carbonate, titanium oxide and carbon black, and organic pigments such as azo, phthalocyanine and quinacridone. The content (% by mass) of the pigment in the ink is favorably 0.1% by mass or more and 15.0% by mass or less, more favorably 0.2% by mass or more and 10.0% by mass or less, based on the total mass of the ink. Another coloring material such as a publicly known dye may also be contained in addition to the pigment in the ink.

The ink constituting the set according to the present invention is required to contain the self-dispersible pigment. As the self-dispersible pigment, may be used a pigment to the particle surface of which an anionic group is bonded directly or through another atomic group. The surface of the pigment particle is bonded to a functional group (an anionic group when the anionic group is directly bonded, or another atomic group and an anionic group when the anionic group is bonded through said another atomic group) by a covalent bond. In the present invention, the weight-average molecular of the functional group (the anionic group when the anionic group is directly bonded, or another atomic group and the anionic group when the anionic group is bonded through said another atomic group) bonded to the surface of the pigment particle is required to be 1,000 or less.

A copolymer having a unit derived from (meth)acrylic acid is contained as a water-soluble resin in the ink used in the present invention as described below. In the present invention, however, it is not expected to disperse the pigment by only the action of this water-soluble resin. That is, the term "self-dispersible" as used in the present invention does not mean that a polymer compound such as a resin or a compound having surface activating ability is adsorbed on the surface of the pigment particle, and the pigment is dispersed by a dispersing action of such a compound. In other words, the self-dispersible pigment used in the present invention can be dispersed without using the above-described specific resin unlike what is called a resin-dispersed pigment by which the dispersion of the pigment is attained by causing the resin (dispersant) to be adsorbed on the surface of the pigment particle.

Examples of the anionic group chemically bonded directly or through another atomic group to the surface of the pigment particle include —COOM, —SO$_3$M, —PO$_3$HM and —PO$_3$M$_2$ (in these formulae, M is a hydrogen atom, alkali metal, ammonium or organic ammonium). Examples of said another atomic group (—R—) include linear or branched alkylene groups having 1 to 12 carbon atoms, arylene groups such as phenylene and naphthylene groups, an amide group, a sulfonyl group, an amino group, a carbonyl group, an ester group and an ether group. Groups obtained by combining these groups may also be mentioned. Examples of the alkali metal represented by M include Li, Na and K. When the anionic group forms a salt, the form of the salt in the ink may be either in such a state that a part thereof has been dissociated or in such a state that the whole thereof has been dissociated.

Besides the above, a self-dispersible pigment subjected to a surface oxidation treatment may also be used as the self-dispersible pigment used in the present invention. Examples of such a self-dispersible pigment include those obtained by methods such as an oxidation treatment with sodium hypochlorite, an ozone treatment in water and a method in which an ozone treatment is conducted, and wet oxidation is then conducted to modify the surface of a pigment particle. In the present invention, a pigment (a resin-dispersed pigment, microcapsule pigment or resin-bonded pigment) of another dispersion system may also be further used in combination with the above-described pigment so far as the effects of the present invention are achieved.

In the present invention, the surface charge amount of the self-dispersible pigment is favorably 0.20 mmol/g or more. The surface charge amount is favorably 5.0 mmol/g or less, more favorably 2.0 mmol/g or less, particularly favorably 1.8 mmol/g or less. The surface charge amount is an index for indicating the amount of the anionic group bonded directly or through another atomic group to the surface of the pigment particle and indicates the amount of the anionic group per gram of the pigment. In present invention, the surface charge amount of the self-dispersible pigment is determined by colloidal titration. This method is simpler than a conventional method of determining the amount of the anionic group by determination of a counter ion of the anionic group and also high in precision and has such a merit that the amount of the anionic group can be directly measured. In Examples which will be described subsequently, the surface charge amount of a pigment in a pigment dispersion liquid was measured by colloidal titration utilizing a potential difference by means of an automatic potentiometric titrator (AT-510; manufactured by KYOTO ELECTRONICS MANUFACTURING CO., LTD.) in which a flow potential titration unit (PCD-500) had been installed. In this case, methylglycol chitosan was used as a titrant. Incidentally, the surface charge amount may naturally be measured by using a pigment extracted from an ink by a proper method.

The self-dispersible pigment whose surface charge amount is 0.20 mmol/g or more has many anionic groups on the particle surface thereof, and these anionic groups repel the carboxy group of the unit derived from (meth)acrylic acid of the water-soluble resin coexisting in the ink. Therefore, the self-dispersible pigment and the water-soluble resin are present with a certain distance therebetween in the ink, so that it is considered that an interaction such as adsorption of the water-soluble resin on the surface of the pigment particle is hard to occur. Accordingly, when the ink is mixed with the reaction liquid on the ejection orifice surface of the recording head, the stabilization of the pigment and resin by the specific nonionic surfactant is more efficiently made, whereby the sticking on the ejection orifice surface of the recording head can be suppressed at a higher level.

On the other hand, when a self-dispersible pigment whose surface charge amount is less than 0.20 mmol/g is caused to coexist with the water-soluble resin to provide an ink, the following are considered to occur. The self-dispersible pigment whose surface charge amount is less than 0.20 mmol/g has a little ionic group on the particle surface thereof, so that a part of the water-soluble resin is present being close to the surface of the pigment particle. Further, this self-dispersible pigment has a large space on the surface of the pigment particle, i.e., portion where no ionic group is bonded, and a hydrophobic portion such as styrene that is a unit constituting the water-soluble resin is easy to be adsorbed thereon. Accordingly, when the ink is mixed with the reaction liquid on the ejection orifice surface of the recording head, an extremely small portion of the resin adsorbed on the surface of the pigment particle forms an aggregate in such a state that the pigment particle has been entangled in the course of insolubilizing the water-soluble resin though the pigment does not aggregate. Even if the nonionic surfactant orients to such an aggregate, the degree of suppression of the sticking on the ejection orifice surface of the recording head may be somewhat lowered in some cases compared with the case where the surface charge amount is high because the stabilizing efficiency is somewhat lowered.

Water-Soluble Resin:

The ink constituting the set according to the present invention contains, as the water-soluble resin, a copolymer having a unit derived from (meth)acrylic acid. The water-soluble resin that is the copolymer defined in the present invention and having the unit derived from (meth)acrylic acid is dissolved in an aqueous medium by the action of the anionic group contained in a (meth)acrylic acid structure. As described above, this water-soluble resin is not used as a dispersant for the above-described self-dispersed pigment. Incidentally, in the present invention, "a resin is water-soluble" means that the resin does not make a particle that has a measurable particle size when the resin is neutralized with an alkali equivalent to the acid value of the resin. A resin satisfying such conditions is described as the water-soluble resin in the present invention. The content (% by mass) of the water-soluble resin in the ink is favorably 0.1% by mass or more and 5.0% by mass or less, more favorably 0.3% by mass or more and 3.0% by mass or less, based on the total mass of the ink. In the water-soluble resin, the weight-average molecular weight thereof is favorably 1,000 or more and 30,000 or less, more favorably 3,000 or more and 15,000 or less.

The water-soluble resin contained in the ink is required to have at least a unit derived from (meth)acrylic acid as a hydrophilic unit. Specifically, the water-soluble resin is favorably a copolymer having at least such another hydrophilic unit as mentioned below and a hydrophobic unit as component units. Incidentally, (meth)acrylic in the following description indicates both acrylic and methacrylic.

Examples of a monomer having a hydrophilic group which will become a hydrophilic unit by polymerization include anionic monomers such as acidic monomers having a carboxy group, such as itaconic acid, maleic acid and fumaric acid, acidic monomers having a phosphonic group, such as (meth)acrylic acid-2-ethyl phosphonate, and anhydrides and salts of these acidic monomers. Incidentally, examples of a cation forming a salt with an anionic monomer include ions of lithium, sodium, potassium, ammonium and organic ammonium.

Examples of a monomer having a hydrophobic group which will become a hydrophobic unit by polymerization include monomers having an aromatic ring, such as styrene, α-methylstyrene and benzyl (meth)acrylate, and monomers having an aliphatic group, such as ethyl (meth)acrylate, methyl (meth)acrylate, (iso)propyl (meth)acrylate, (n-, iso-, t-)butyl (meth)acrylate and 2-ethylhexyl (meth)acrylate.

In the present invention, a water-soluble resin having a unit high in hydrophobicity to some extent is favorably used because an interaction between the insolubilized matter of the resin and the nonionic surfactant can be more efficiently caused, and the sticking on the ejection orifice surface of the recording head can be suppressed at a higher level. Specifically, a copolymer having at least a hydrophilic unit derived from the monomer having a carboxy group and a hydrophobic unit derived from the monomer having an aromatic ring or the monomer having a aliphatic group is particularly favorably used in the present invention.

According to an investigation by the present inventors, the water-soluble resin is favorably not too high in the hydrophilicity of the insolubilized matter of the resin while retaining the water-solubility in the ink. Therefore, the acid value of the water-soluble resin is favorably 100 mg KOH/g or more and 180 mg KOH/g or less. The water-soluble resin exhibiting the acid value within this range is efficiently insolubilized when contacted with the reaction liquid while retaining the water-solubility in the ink, and a larger aggregate is formed by collision with the pigment, so that a higher optical density can be achieved.

The content (% by mass) of the water-soluble resin in the ink constituting the set according to the present invention is favorably 0.25 times or more in terms of mass ratio as much as the content (% by mass) of the pigment. Incidentally, the contents of the water-soluble resin and the pigment in this case are values based on the total mass of the ink. When the mass ratio is 0.25 times or more, the amount of the resin insolubilized by the contact with the reaction liquid becomes sufficient, and the pigment can be efficiently present on the surface of a recording medium, so that a higher optical density can be achieved. The content (% by mass) of the water-soluble resin in the ink is favorably 0.75 times or less in terms of mass ratio as much as the content (% by mass) of the pigment.

Aqueous Medium:

Water or a mixed solvent of water and a water-soluble organic solvent is favorably contained as an aqueous medium in the ink constituting the set according to the present invention. Deionized water or ion-exchanged water is favorably used as water. In the present invention, an aqueous ink containing at least water as the aqueous medium is particularly favorably provided. The content (% by mass) of water in the ink is favorably 50.0% by mass or more and 95.0% by mass or less based on the total mass of the ink. All of publicly known water-soluble organic solvents generally used in an ink for ink jet may be used as the water-soluble organic solvent. One or more water-soluble organic solvents may be used. Specific examples thereof include monohydric or polyhydric alcohols, alkylene glycols the alkylene group of which has about 1 to 4 carbon atoms, polyethylene glycols having an average molecular weight of about 200 to 2,000, glycol ethers and nitrogen-containing compounds. The content (% by mass) of the water-soluble organic solvent in the ink is favorably 3.0% by mass or more and 50.0% by mass or less based on the total mass of the ink.

Other Components:

In addition to the above-described components, an organic compound that is solid at ordinary temperature, for example, a nitrogen-containing compound such as urea or ethyleneurea, and trimethylolethane or trimethylolpropane may also be contained in the ink constituting the set according to the present invention as needed. In addition to the above-described components, various additives such as a surfactant, a pH adjustor, an antifoaming agent, a rust preventive, a preservative, a mildewproofing agent, an antioxidant, an anti-reducing agent, an evaporation accelerator and a chelating agent may also be further contained in the ink as needed.

A surfactant acting as a penetrant is particularly favorably contained in the ink constituting the set according to the present invention. All of publicly known surfactants generally used in an ink for ink jet may be used as the surfactant. One or more surfactants may be used. Specific examples thereof include nonionic surfactants such as polyoxyethylene alkyl ethers, acetylene glycol compounds, ethylene oxide adducts of acetylene glycol and polyoxyethylene-polyoxypropylene block copolymers, anionic surfactants, cationic surfactants, amphoteric surfactants such as betaine compounds, and surfactants such as fluorine compounds and silicone compounds. The content (% by mass) of the surfactant in the ink is favorably 0.1% by mass or more and 2.0% by mass or less, more favorably 0.3% by mass or more and 1.5% by mass or less, based on the total mass of the ink though it varies according to the structure and HLB value of the surfactant.

The surface tension of the ink constituting the set according to the present invention is favorably 25 mN/m or more and 38 mN/m or less, more favorably 34 mN/m or less. If the surface tension is more than 38 mN/m, penetration and diffusion of such an ink into a recording medium slow, and the time required for drying the ink may become long in some cases. If the surface tension is less than 25 mN/m on the other hand, such an ink tends to excessively penetrate into a recording medium, so that the ink may reach a back surface of the recording medium in some cases to easily cause strike-through. The surface tension of the ink can be controlled by suitably determining the kinds and contents of the water-soluble organic solvent and the surfactant. Incidentally, the surface tension of the ink is a static surface tension at 25° C. as measured by the platinum plate method. The pH of the ink is favorably 6.0 or more and 9.5 or less. If the pH is less than 6.0, the dispersion stability of the pigment tends to be lowered, and so the storage stability of the ink may be not sufficiently achieved in some cases. If the pH is more than 9.5 on the other hand, such a problem that the liquid-contact property of the ink with respect to a member constituting an ink jet recording apparatus is lowered may be liable to occur in some cases.

Image Forming Method:

An image forming method according to the present invention has a step of respectively ejecting an ink and a reaction liquid from a recording head of an ink jet system to apply them to a recording medium, wherein the ink and the reaction liquid are brought into contact with each other on the recording medium to form an image. At this time, the set according to the present invention which is made up of the ink and reaction liquid described above is used. As an apparatus for conducting the image forming method according to the present invention, is used an ink jet recording apparatus, and any publicly known construction may be adopted. As a recording head installed in the ink jet recording apparatus, there is such a system that a liquid is ejected by action of mechanical energy or thermal energy. However, the recording head of the system that the liquid is ejected by the action of the thermal energy is particularly favorably used in the present invention.

The order of the application of the ink and the reaction liquid to a recording medium includes cases where the reaction liquid is applied, and the ink is then applied, where the ink is applied, and the reaction liquid is then applied and where these are combined. In view of the object of the present invention, however, the case where the reaction liquid is applied, and the ink is then applied is favorably at least included. From the viewpoint of ejection stability from the recording head of the ink jet system, the viscosities of the ink and the reaction liquid are each favorably 1 mPa·s or more and 15 mPa·s or less, more favorably 1 mPa·s or more and 5 mPa·s or less, regarding characteristics thereof. In addition, the reaction liquid is favorably caused to efficiently react with the intended ink. Therefore, the surface tension of the reaction liquid is favorably controlled higher than that of the ink that is an object of being destabilized by the reaction liquid within limits capable of being ejected from the recording head in such a manner that the reaction liquid does not feather on another portion than a recording region with the desired ink.

The application amount of the reaction liquid to the recording medium may be suitably adjusted according to the buffering ability of the reaction liquid and the constitution of the ink to be reacted thereto. In the present invention, the application amount of the reaction liquid is favorably controlled to 0.5 g/m² or more and 10.0 g/m² or less, more favorably more than 2.0 g/m² and 5.0 g/m² or less, from the viewpoint of uniformity of the resulting image. Incidentally, when a region where the reaction liquid is applied is a certain portion with respect to the size (area: m²) of the recording medium, the application amount value (g/m²) of the reaction liquid is determined assuming that the reaction liquid is applied to the whole surface of the recording medium, and this value favorably satisfies the above range.

EXAMPLES

The present invention will hereinafter be described more specifically by the following Examples and Comparative Examples. However, the present invention is not limited to the following Examples unless going beyond the gist of the present invention. Incidentally, "parts" or "part" and "%" in the following are based on mass unless expressly noted. Various physical property values are values measured at 25° C. A pH meter (F-21; manufactured by Horiba Co. Ltd.) was used for measurement of a pH.

Preparation for Pigment Dispersion Liquid:

Surface Charge Amount of Self-Dispersible Pigment

A method for measuring the surface charge amount of a self-dispersible pigment is first described. The surface charge amount of a self-dispersible pigment in a pigment dispersion liquid was measured by potentiometric titration using an automatic potentiometric titrator AT-510 (manufactured by KYOTO ELECTRONICS MANUFACTURING CO., LTD.) in which a flow potential titration unit (PCD-500) had been installed and using methylglycol chitosan as a titrant.

Pigment Dispersion Liquid 1

In a condition of being cooled to 5° C., 1.5 g of 4-aminophthalic acid was added into a solution with 5 g of concentrated hydrochloric acid dissolved in 5.5 g of water. A vessel in which this solution was placed was then put in an ice bath, and the solution was stirred to always keep the solution at 10° C. or less. A solution with 1.8 g of sodium nitrite dissolved in 9 g of water at 5° C. was added into this solution. After this solution was stirred for additional 15 minutes, 6 g of carbon black having a specific surface area of 220 m²/g and a DBP oil absorption of 105 mL/100 g was added under stirring. Thereafter, the resultant mixture was stirred for additional 15 minutes. After the resultant slurry was filtered through a filter paper (Criteria Filter Paper No. 2; product of Advantec Co.), the resultant particles were fully washed with water and dried in an oven controlled to 110° C., thereby preparing a self-dispersible pigment 1 to the particle surface of which a —$C_6H_3$—$(COONa)_2$ group was bonded. Water was added to the resultant self-dispersible pigment 1 to disperse the pigment so as to give a pigment content of 10.0%, thereby preparing a pigment dispersion liquid 1. The surface charge amount of the self-dispersible pigment 1 was 0.41 mmol/g and the weight-average molecular weight of the functional group bonded to the surface of the pigment particle was 209.

Pigment Dispersion Liquid 2

A reactor was charged with 500 g of carbon black having a specific surface area of 220 m²/g and a DBP oil absorption of 105 mL/100 g, 45 g of aminophenyl (2-sulfoethyl) sulfone (APSES) and 900 g of distilled water. The contents were then stirred for 20 minutes at 300 rpm and 55° C. Forty grams of 25% sodium nitrite was added dropwise over 15 minutes into this mixture, and 50 g of distilled water was further added. A reaction was then conducted for 2 hours at 60° C. A reaction product was taken out while being diluted, thereby adjusting the reaction product so as to give a solid content of 15.0%. Thereafter, impurities were removed by centrifugation to obtain a dispersion liquid A. A pigment to which APSES was bonded was contained in this dispersion liquid A.

The following operation was then conducted for determining the number of moles of the group bonded to the pigment in this dispersion liquid A. A sodium ion electrode (1512A-10C; manufactured by Horiba Co. Ltd.) was used to measure a concentration of a sodium ion in the dispersion liquid to convert it to the number of moles per the solid content of the pigment. The dispersion liquid A whose solid content was 15.0% was added dropwise over 1 hour into a solution of pentaethylenehexamine (PEHA) while being vigorously stirred. The concentration of PEHA in the PEHA solution in this case was controlled to 2 to 3 times as much as the number of moles of the sodium ion measured above, and the amount of the solution was set to be equal to the amount of the dispersion liquid A. After this mixture was stirred for 48 hours, impurities were removed to obtain a dispersion liquid B. A pigment to which PEHA was bonded through APSES was contained in this dispersion liquid B, and the solid content thereof was 10.0%.

A styrene-n-butyl acrylate-acrylic acid terpolymer (compositional (molar) ratio: 33/44/23) that is a water-soluble resin was dissolved in water with sodium hydroxide in such an amount that the neutralization equivalent is 1 to prepare an aqueous solution C1 whose water-soluble resin content was 10.0%. The weight-average molecular weight of this water-soluble resin is 600, and the acid value thereof is 120 mg KOH/g. Into 200 g of the aqueous solution C1 was further added 1,300 g of distilled water, and stirring was conducted to prepare an aqueous resin solution. Five hundred grams of the dispersion liquid B whose solid content was 10.0% was added dropwise into this aqueous resin solution with stirring. The resultant mixture was then transferred to a PYREX (trademark) evaporating dish and heated for 15 hours at 150° C. to evaporate the liquid components, and the resultant dried product was then cooled to room temperature. This dried product was then added into distilled water whose pH was adjusted to 9.0 with sodium hydroxide and dispersed by means of a dispersing machine. A 1.0 mol/L solution of sodium hydroxide was further added under stirring to adjust the pH of the liquid to 10 to 11. Thereafter, desalting was conducted, impurities and coarse particles were removed, and a centrifugal treatment was additionally conducted to remove the resin which was not bonded to the pigment, thereby preparing a pigment dispersion liquid 2 whose pigment content was 10.0% and whose resin content was 2.0%. The surface charge amount of a self-dispersible pigment 2 in the pigment dispersion liquid 2 was 0.36 mmol/g and the weight-average molecular weight of the functional group bonded to the surface of the pigment particle was 951. Incidentally, the contents of the pigment and resin in the pigment dispersion liquid 2 were values determined by using a sample for measurement obtained by drying the pigment dispersion liquid 2 to solids and measuring a rate of loss in weight by thermogravimetry.

Pigment Dispersion Liquid 3

A commercially available pigment dispersion liquid (Cab-O-Jet 465M; product of Cabot Co.) containing a self-dispersible pigment with a functional group containing a phosphonic group bonded to the particle surface of C.I. Pigment Red 122 was used as a pigment dispersion liquid 3. The content of the self-dispersible pigment 3 in the pigment dispersion liquid 3 was 15.0%, and the surface charge amount of the self-dispersible pigment 3 was 0.22 mmol/g and the weight-average molecular weight of the functional group bonded to the surface of the pigment particle was 469.

Pigment Dispersion Liquid 4

A commercially available pigment dispersion liquid (Cab-O-Jet 250C; product of Cabot Co.) containing a self-dispersible pigment with a functional group containing a sulfonic group bonded to the particle surface of C.I. Pigment Blue 15:4 was used as a pigment dispersion liquid 4. The content of the self-dispersible pigment 4 in the pigment dispersion liquid 4 was 10.0%, and the surface charge amount of the self-dispersible pigment 4 was 0.21 mmol/g and the weight-average molecular weight of the functional group bonded to the surface of the pigment particle was 179.

Pigment Dispersion Liquid 5

A commercially available pigment dispersion liquid (Cab-O-Jet 450C; product of Cabot Co.) containing a self-dispersible pigment with a functional group containing a phosphonic group bonded to the particle surface of C.I. Pigment Blue 15:4 was used as a pigment dispersion liquid 5. The content of the self-dispersible pigment 5 in the pigment dispersion liquid 5 was 15.0%, and the surface charge amount of the self-dispersible pigment 5 was 0.17 mmol/g and the weight-average molecular weight of the functional group bonded to the surface of the pigment particle was 469.

Pigment Dispersion Liquid 6:

In a condition of being cooled to 5° C., 0.8 g of p-aminobenzoic acid was added into a solution with 2.5 g of concentrated hydrochloric acid dissolved in 5.5 g of water. A vessel in which this solution was placed was then put in an ice bath, and the solution was stirred to always keep the solution at 10° C. or less. A solution with 0.9 g of sodium nitrite dissolved in 9 g of water at 5° C. was added into this solution. After this solution was stirred for additional 15 minutes, 9 g of carbon black having a specific surface area of 220 $m^2$/g and a DBP oil absorption of 105 mL/100 g was added under stirring. Thereafter, the resultant mixture was stirred for additional 15 minutes. After the resultant slurry was filtered through a filter paper (Standard Filter Paper No. 2; product of Advantec Co.), the resultant particles were fully washed with water and dried in an oven controlled to 110° C., thereby preparing a self-dispersible pigment 6 to the particle surface of which a —$C_6H_4$—COONa group was bonded. Water was added to the resultant self-dispersible pigment 6 to disperse the pigment so as to give a pigment content of 10.0%, thereby preparing a pigment dispersion liquid 6. The surface charge amount of the self-dispersible pigment 6 was 0.16 mmol/g and the weight-average molecular weight of the functional group bonded to the surface of the pigment particle was 143.

Pigment Dispersion Liquid 7

A commercially available pigment dispersion liquid (Cab-O-Jet 260M; product of Cabot Co.) containing a self-dispersible pigment with a functional group containing a sulfonic group bonded to the particle surface of C.I. Pigment Red 122 was used as a pigment dispersion liquid 7. The content of the self-dispersible pigment 7 in the pigment dispersion liquid 7 was 10.0%, and the surface charge amount of the self-dispersible pigment 7 was 0.15 mmol/g and the weight-average molecular weight of the functional group bonded to the surface of the pigment particle was 179.

Pigment Dispersion Liquid 8

A commercially available pigment dispersion liquid (Cab-O-Jet 270Y; product of Cabot Co.) containing a self-dispersible pigment with a functional group containing a sulfonic group bonded to the particle surface of C.I. Pigment Yellow 74 was used as a pigment dispersion liquid 8. The content of the self-dispersible pigment 8 in the pigment dispersion liquid 8 was 10.0%, and the surface charge amount of the self-dispersible pigment 8 was 0.13 mmol/g and the weight-average molecular weight of the functional group bonded to the surface of the pigment particle was 179.

Pigment Dispersion Liquid 9

A commercially available pigment dispersion liquid (Cab-O-Jet 470Y; product of Cabot Co.) containing a self-dispersible pigment with a functional group containing a phosphonic group bonded to the particle surface of C.I. Pigment Yellow 74 was used as a pigment dispersion liquid 9. The content of the self-dispersible pigment 9 in the pigment dispersion liquid 9 was 15.0%, and the surface charge amount of the self-dispersible pigment 9 was 0.12 mmol/g and the weight-average molecular weight of the functional group bonded to the surface of the pigment particle was 469.

Pigment Dispersion Liquid 10

Two parts of a styrene-n-butyl acrylate-acrylic acid terpolymer (compositional (molar) ratio: 33/44/23) that is a water-soluble resin was dissolved in ion-exchanged water with sodium hydroxide in such an amount that the neutralization equivalent is 1. The weight-average molecular weight of this water-soluble resin is 5,000, and the acid value thereof is 120 mg KOH/g. To this solution, was added 10.0 parts of carbon black having a specific surface area of 220 m$^2$/g and a DBP oil absorption of 105 mL/100 g, and ion-exchanged water was additionally added until 100.0 parts in total. This mixture was subjected to a dispersing treatment for 3 hours by means of a batch type vertical sand mill. The resultant dispersion liquid was centrifuged, thereby removing coarse particles. Thereafter, the thus treated mixture was filtered under pressure through a microfilter (product of Fuji Film Co., Ltd.) having a pore size of 3.0 μm, and ion-exchanged water was added to obtain a pigment dispersion liquid 10. The content of the pigment in the pigment dispersion liquid 10 was 10.0%, and the content of the resin was 2.0%.

Pigment Dispersion Liquid 11

Two parts of a styrene-n-butyl acrylate-acrylic acid terpolymer (compositional (molar) ratio: 33/44/23) that is a water-soluble resin was dissolved in water with sodium hydroxide in such an amount that the neutralization equivalent is 1 to prepare an aqueous solution C2 whose water-soluble resin content was 10.0%. The weight-average molecular weight of this water-soluble resin is 1,000, and the acid value thereof is 120 mg KOH/g. A pigment dispersion liquid 11 whose pigment content was 10.0% and whose resin content was 2.0% was prepared in the same manner as in Pigment dispersion liquid 2 except that the aqueous solution C1 was changed to the aqueous solution C2. The surface charge amount of the self-dispersible pigment 11 in the pigment dispersion liquid 11 was 0.36 mmol/g and the weight-average molecular weight of the functional group bonded to the surface of the pigment particle was 1,351.

Preparation of Water-Soluble Resin:

Water-Soluble Resin 1

A styrene-n-butyl acrylate-acrylic acid terpolymer (compositional (molar) ratio: 33/44/23) having a weight-average molecular weight of 5,000 and an acid value of 120 mg KOH/g was synthesized by a conventional method. The terpolymer was then neutralized with potassium hydroxide equivalent to the acid value of the terpolymer. Water was then added to prepare an aqueous resin solution 1 in which the content of the water-soluble rein 1 was 10.0%.

Water-Soluble Resin 2

A commercially available styrene-acrylic acid copolymer (JONCRYL 586; product of BASF Co.) having a weight-average molecular weight of 4,600 and an acid value of 108 mg KOH/g was neutralized with potassium hydroxide equivalent to the acid value of the copolymer. Water was then added to prepare an aqueous resin solution 2 in which the content of the water-soluble rein 2 was 10.0%.

Water-Soluble Resin 3

A styrene-acrylic acid copolymer (compositional (molar) ratio: 75/15) having a weight-average molecular weight of 5,000 and an acid value of 95 mg KOH/g was synthesized by a conventional method. The copolymer was then neutralized with potassium hydroxide equivalent to the acid value of the copolymer. Water was then added to prepare an aqueous resin solution 3 in which the content of the water-soluble rein 3 was 10.0%.

Water-Soluble Resin 4

A commercially available styrene-acrylic acid copolymer (JONCRYL 683; product of BASF Co.) having a weight-average molecular weight of 8,000 and an acid value of 160 mg KOH/g was neutralized with potassium hydroxide equivalent to the acid value of the copolymer. Water was then added to prepare an aqueous resin solution 4 in which the content of the water-soluble rein 4 was 10.0%.

Water-Soluble Resin 5

A commercially available styrene-acrylic acid copolymer (JONCRYL 678; product of BASF Co.) having a weight-average molecular weight of 8,500 and an acid value of 215 mg KOH/g was neutralized with potassium hydroxide equivalent to the acid value of the copolymer. Water was then added to prepare an aqueous resin solution 5 in which the content of the water-soluble rein 5 was 10.0%.

Water-Soluble Resin 6

A styrene-acrylamide-t-butyl sulfonic acid copolymer (compositional (molar) ratio: 48/52) having a weight-average molecular weight of 8,000 and an acid value of 140 mg KOH/g was synthesized by a conventional method. The copolymer was then neutralized with potassium hydroxide equivalent to the acid value of the copolymer. Water was then added to prepare an aqueous resin solution 6 in which the content of the water-soluble rein 6 was 10.0%.

Structure and Physical Properties of Surfactant:

In Table 1 are shown the structures and HLB values of respective surfactants that are nonionic surfactants. In addition, when such a surfactant corresponds to the surfactant defined in the present invention, the general formula and number of carbon atoms of a higher alcohol and the number of ethylene oxide groups added are also shown collectively. Incidentally, the HLB value is a value determined by the Griffin method according to the equation (1). In Table 1, NIKKOL BC-20, BO-20, BB-20, BL-21, BT-12 and BC-10 (trade names) are all surfactants produced by Nikko Chemicals Co., Ltd. EMALEX 1825, 1615, 512 and CS-30 (trade names) are all surfactants produced by Nihon Emulsion Co., Ltd. ACETYLENOL E100 (trade name) is a surfactant produced by Kawaken Fine Chemicals Co., Ltd.

TABLE 1

Structure and physical properties of surfactant

|  | Structure | HLB value | Higher alcohol General formula | Higher alcohol Number of carbon atoms | Number of ethylene oxide groups added |
|---|---|---|---|---|---|
| NIKKOL BC-20 | Polyoxyethylene cetyl ether | 15.7 | $C_{16}H_{33}OH$ | 16 | 20 |
| NIKKOL BO-20 | Polyoxyethylene oleyl ether | 15.3 | $C_{18}H_{35}OH$ | 18 | 20 |
| NIKKOL BB-20 | Polyoxyethylene behenyl ether | 14.6 | $C_{22}H_{45}OH$ | 22 | 20 |
| EMALEX 1825 | Polyoxyethylene isostearyl ether | 16.1 | $C_9H_{19}CH(C_7H_{15})CH_2OH$ | 18 | 25 |
| EMALEX 1615 | Polyoxyethylene isocetyl ether | 14.6 | $C_8H_{17}CH(C_6H_{13})CH_2OH$ | 16 | 15 |
| EMALEX 512 | Polyoxyethylene oleyl ether | 13.3 | $C_{18}H_{35}OH$ | 18 | 12 |
| NIKKOL BL-21 | Polyoxyethylene lauryl ether | 16.6 | $C_{12}H_{25}OH$ | 12 | 21 |
| NIKKOL BT-12 | Polyoxyethylene secondary tridecyl ether | 14.5 | $C_6H_{13}CH(C_6H_{13})OH$ | 13 | 12 |
| ACETYLENOL E100 | Acetylene glycol ethylene oxide adduct | 13.3 | — | 14 | 10 |
| EMALEX CS-30 | Polyoxyethylene cholesteryl ether | 14.0 | — | 25 | 30 |
| NIKKOL BC-10 | Polyoxyethylene cetyl ether | 12.9 | $C_{16}H_{33}OH$ | 16 | 10 |

Preparation of Ink:

After the respective components (unit: %) shown in upper lines of Table 2 were mixed and sufficiently stirred, the respective mixtures were filtered under pressure through a microfilter (product of Fuji Film Co., Ltd.) having a pore size of 3.0 μm to prepare respective inks. Incidentally, ACETYLENOL E100 (trade name) is a surfactant produced by Kawaken Fine Chemicals Co., Ltd., and polyethylene glycol used was that having an average molecular weight of 600. In lower lines of Table 2 are shown the content (times) of the pigment, the content (%) of the water-soluble resin and the mass ratio (times) of (content of the water-soluble resin)/(content of the pigment) in each ink, and the amount (μmol/g) of the carboxy group of the water-soluble resin.

Incidentally, the amount (μmol/g) of the carboxy group of the water-soluble resin in the ink can be calculated from the content of the water-soluble resin in the ink and the acid value thereof. Since the acid value is an amount (unit: mg) of potassium hydroxide required to neutralize 1 g of the resin, the value (acid value)$\times 10^{-3}$/(molecular weight of potassium hydroxide (56.1)) amounts to the amount (unit: mol) of the carboxy group present in 1 g of the resin. Accordingly, the amount (μmol/g) of the carboxy group of the water-soluble resin in the ink can be calculated according to the equation (amount (mol) of the carboxy group present in 1 g of the resin)×(amount of the resin per gram of the ink (g/g of the ink))×1,000,000. When the amount is calculated taking Ink 1 as an example, 1.5% of the water-soluble resin having an acid value of 120 mg KOH/g is contained in 1 g of Ink 1. Accordingly, the amount of the carboxy group of the water-soluble resin in the ink amounts to $(120\times 10^{-3}/56.1)\times(1.5/100)\times 1,000,000=32.1$ (μmol/g). Incidentally, in order to determine the amount of the carboxy group of the water-soluble resin in the ink from the ink containing the water-soluble resin, the acid value of the water-soluble resin precipitated in the ink by a method such as acid precipitation is found by titration, and the calculation is made in the same manner as described above, whereby such an amount can be determined.

TABLE 2

Composition and characteristics of ink

| | Ink No. 1 | 2 | 3 | 4 | 5 | 6 | 7 | 8 | 9 | 10 |
|---|---|---|---|---|---|---|---|---|---|---|
| Pigment dispersion liquid 1 | 30.0 | | 30.0 | 30.0 | 30.0 | 30.0 | 30.0 | 30.0 | | |
| Pigment dispersion liquid 2 | | 30.0 | | | | | | | | |
| Pigment dispersion liquid 3 | | | | | | | | | 20.0 | |
| Pigment dispersion liquid 4 | | | | | | | | | | 30.0 |
| Pigment dispersion liquid 5 | | | | | | | | | | |
| Pigment dispersion liquid 6 | | | | | | | | | | |
| Pigment dispersion liquid 7 | | | | | | | | | | |
| Pigment dispersion liquid 8 | | | | | | | | | | |
| Pigment dispersion liquid 9 | | | | | | | | | | |
| Pigment dispersion liquid 10 | | | | | | | | | | |
| Pigment dispersion liquid 11 | | | | | | | | | | |
| Aqueous resin solution 1 | 15.0 | 9.0 | 7.5 | 7.0 | | | | | 15.0 | 15.0 |
| Aqueous resin solution 2 | | | | | 7.5 | | | | | |
| Aqueous resin solution 3 | | | | | | 15.0 | | | | |
| Aqueous resin solution 4 | | | | | | | 15.0 | | | |
| Aqueous resin solution 5 | | | | | | | | 15.0 | | |
| Aqueous resin solution 6 | | | | | | | | | | |
| Polyethylene glycol | 4.0 | 4.0 | 4.0 | 4.0 | 4.0 | 4.0 | 4.0 | 4.0 | 4.0 | 4.0 |
| Glycerol | 10.0 | 10.0 | 10.0 | 10.0 | 10.0 | 10.0 | 10.0 | 10.0 | 10.0 | 10.0 |
| Ethyleneurea | 5.0 | 5.0 | 5.0 | 5.0 | 5.0 | 5.0 | 5.0 | 5.0 | 5.0 | 5.0 |

TABLE 2-continued

Composition and characteristics of ink

| | | | | | | | | | | |
|---|---|---|---|---|---|---|---|---|---|---|
| ACETYLENOL E100 | 1.0 | 1.0 | 1.0 | 1.0 | 1.0 | 1.0 | 1.0 | 1.0 | 1.0 | 1.0 |
| Ion-exchanged water | 35.0 | 41.0 | 42.5 | 43.0 | 42.5 | 35.0 | 35.0 | 35.0 | 45.0 | 35.0 |
| Content of pigment | 3.0 | 3.0 | 3.0 | 3.0 | 3.0 | 3.0 | 3.0 | 3.0 | 3.0 | 3.0 |
| Content of water-soluble resin | 1.5 | 1.5 | 0.75 | 0.7 | 0.75 | 1.5 | 1.5 | 1.5 | 1.5 | 1.5 |
| Water-soluble resin/pigment | 0.50 | 0.50 | 0.25 | 0.23 | 0.25 | 0.50 | 0.50 | 0.50 | 0.50 | 0.50 |
| Pigment + water-soluble resin | 4.5 | 4.5 | 3.75 | 3.7 | 3.75 | 4.5 | 4.5 | 4.5 | 4.5 | 4.5 |
| Amount of carboxy group | 32.1 | 32.1 | 16.0 | 15.0 | 14.4 | 25.4 | 42.8 | 57.5 | 32.1 | 32.1 |

| | Ink No. | | | | | | | | | |
|---|---|---|---|---|---|---|---|---|---|---|
| | 11 | 12 | 13 | 14 | 15 | 16 | 17 | 18 | 19 | 20 |
| Pigment dispersion liquid 1 | | | | | | | | | 30.0 | 30.0 |
| Pigment dispersion liquid 2 | | | | | | | | | | |
| Pigment dispersion liquid 3 | | | | | | | | | | |
| Pigment dispersion liquid 4 | | | | | | | | | | |
| Pigment dispersion liquid 5 | 20.0 | | | | | | | | | |
| Pigment dispersion liquid 6 | | 30.0 | | | | 30.0 | | | | |
| Pigment dispersion liquid 7 | | | 30.0 | | | | | | | |
| Pigment dispersion liquid 8 | | | | 30.0 | | | | | | |
| Pigment dispersion liquid 9 | | | | | 20.0 | | | | | |
| Pigment dispersion liquid 10 | | | | | | | 30.0 | | | |
| Pigment dispersion liquid 11 | | | | | | | | 30.0 | | |
| Aqueous resin solution 1 | 15.0 | 15.0 | 15.0 | 15.0 | 15.0 | | 9.0 | 9.0 | | |
| Aqueous resin solution 2 | | | | | | | | | | |
| Aqueous resin solution 3 | | | | | | 7.0 | | | | |
| Aqueous resin solution 4 | | | | | | | | | | |
| Aqueous resin solution 5 | | | | | | | | | | |
| Aqueous resin solution 6 | | | | | | | | | | 15.0 |
| Polyethylene glycol | 4.0 | 4.0 | 4.0 | 4.0 | 4.0 | 4.0 | 4.0 | 4.0 | 4.0 | 4.0 |
| Glycerol | 10.0 | 10.0 | 10.0 | 10.0 | 10.0 | 10.0 | 10.0 | 10.0 | 10.0 | 10.0 |
| Ethyleneurea | 5.0 | 5.0 | 5.0 | 5.0 | 5.0 | 5.0 | 5.0 | 5.0 | 5.0 | 5.0 |
| ACETYLENOL E100 | 1.0 | 1.0 | 1.0 | 1.0 | 1.0 | 1.0 | 1.0 | 1.0 | 1.0 | 1.0 |
| Ion-exchanged water | 45.0 | 35.0 | 35.0 | 35.0 | 45.0 | 43.0 | 41.0 | 41.0 | 50.0 | 35.0 |
| Content of pigment | 3.0 | 3.0 | 3.0 | 3.0 | 3.0 | 3.0 | 3.0 | 3.0 | 3.0 | 3.0 |
| Content of water-soluble resin | 1.5 | 1.5 | 1.5 | 1.5 | 1.5 | 0.7 | 1.5 | 1.5 | 0.0 | 1.5 |
| Water-soluble resin/pigment | 0.50 | 0.50 | 0.50 | 0.50 | 0.50 | 0.23 | 0.50 | 0.50 | 0.00 | 0.50 |
| Pigment + water-soluble resin | 4.5 | 4.5 | 4.5 | 4.5 | 4.5 | 3.7 | 4.5 | 4.5 | 3.0 | 4.5 |
| Amount of carboxy group | 32.1 | 32.1 | 32.1 | 32.1 | 32.1 | 11.9 | 32.1 | 32.1 | 0.0 | 37.4 |

Preparation of Reaction Liquid:

After the respective components (unit: %) shown in upper lines of Table 3 were mixed, a 8 mol/L (33.8%) aqueous solution of potassium hydroxide was added in an amount (unit: g) required to give a pH shown in a lower line of Table 3, and the resultant mixtures were sufficiently stirred. Thereafter, the mixtures were filtered under pressure through a cellulose acetate filter (product of Advantec Co.) having a pore size of 0.45 μm to prepare respective reaction liquids. Incidentally, ACETYLENOL E100 (trade name) is a surfactant produced by Kawaken Fine Chemicals Co., Ltd., and polyethylene glycol used was that having an average molecular weight of 600. The pH of each reaction liquid was measured at 25° C. by means of a pH meter (trade name: F-21; manufactured by Horiba Co. Ltd.). In lower lines of Table 3 are shown the content (%) of the surfactant and the amount (μmol/g) of an acidic group of an acid form of the organic acid in each reaction liquid.

Incidentally, the amount (μmol/g) of the acidic group of the acid form of the organic acid in the reaction liquid can be calculated from the content of the organic acid in the reaction liquid and the amount of the base (metal hydroxide) used in the pH adjustment of the reaction liquid. In the reaction liquid, the acidic group of the organic acid is present in any form of an associated form and an acid form, and the total amount of the acidic groups of the dissociated form and the acid form can be determined from the kind and content of the organic acid. Since the amount of the acidic group of the dissociated form of the organic acid may be estimated to be equal to the amount of a cation of the base added for the pH adjustment, the amount of the acidic group of the acid form is equal to a value obtained by subtracting the amount of the acidic group of the dissociated form (i.e., the amount of the cation of the base) from the total amount of the acidic groups of the organic acid. When the amount is calculated taking Reaction liquid 1 as an example, 5.0% of glutaric acid (dicarboxylic acid, molecular weight: 132.12) is contained in Reaction liquid 1. Accordingly, the total amount of the acidic groups per 100 g of the reaction liquid amounts to 5.0×2/132.12×1,000=75.7 mmol/100 g. On the other hand, since 4.35 g of the 33.8% aqueous solution of potassium hydroxide (molecular weight: 56.1) is used for the pH adjustment, the amount of the cation (potassium) pre 100 g of the reaction liquid amounts to 4.35×33.8/100/56.1×1,000=26.2 mmol/100 g. The amount of this potassium may be estimated to be equal to the amount of the acidic group of the dissociated form of the organic acid. The amount of the acidic group of the acid form of the organic acid in the reaction liquid is equal to (total amount of the acidic groups)−(amount of potassium), i.e., 75.7 mmol/100 g−26.2 mmol/100 g=49.5 mmol/100 g=495 μmol/g. Incidentally, in order to determine the amount of the acidic group of the acid form of the organic acid in the reaction liquid from the reaction liquid containing the organic acid and the metal hydroxide, the determination can be made according to the following procedure. That is, the kind and content of the organic acid are found by a method such as high-performance liquid chromatography, the amount of the metal ion is found by a method such as ICP emission spectral analysis, and the calculation is made in the same manner as described above, whereby such an amount can be determined.

TABLE 3

Composition and characteristics of reaction liquid

| | Reaction liquid No. | | | | | | | | | | |
|---|---|---|---|---|---|---|---|---|---|---|---|
| | 1 | 2 | 3 | 4 | 5 | 6 | 7 | 8 | 9 | 10 | 11 |
| Glutaric acid | 5.0 | 5.0 | 5.0 | 5.0 | 5.0 | 5.0 | 5.0 | 5.0 | 5.0 | 5.0 | |
| Propionic acid | | | | | | | | | | | 2.7 |
| Magnesium sulfate | | | | | | | | | | | |
| Trimethylolpropane | 20.0 | 20.0 | 20.0 | 20.0 | 20.0 | 20.0 | 20.0 | 20.0 | 20.0 | 20.0 | 20.0 |
| Polyethylene glycol | | | | | | | | | | | |
| Glycerol | | | | | | | | | | | |
| Ethyleneurea | | | | | | | | | | | |
| NIKKOL BC-20 | 1.0 | | | | | | | 1.0 | 1.0 | 1.0 | 1.0 | 1.0 |
| NIKKOL BO-20 | | 1.0 | | | | | | | | | |
| NIKKOL BB-20 | | | 1.0 | | | | | | | | |
| EMALEX 1825 | | | | 1.0 | | | | | | | |
| EMALEX 1615 | | | | | 1.0 | | | | | | |
| EMALEX 512 | | | | | | 1.0 | | | | | |
| NIKKOL BL-21 | | | | | | | | | | | |
| NIKKOL BT-12 | | | | | | | | | | | |
| ACETYLENOL E100 | | | | | | | | | | | |
| EMALEX CS-30 | | | | | | | | | | | |
| NIKKOL BC-10 | | | | | | | | | | | |
| Ion-exchanged water | 74.0 | 74.0 | 74.0 | 74.0 | 74.0 | 74.0 | 74.0 | 74.0 | 74.0 | 74.0 | 76.3 |
| pH | 4.0 | 4.0 | 4.0 | 4.0 | 4.0 | 4.0 | 3.0 | 3.5 | 5.5 | 5.7 | 4.0 |
| Amount of KOH | 4.35 | 4.35 | 4.35 | 4.35 | 4.35 | 4.35 | 0.34 | 1.02 | 10.6 | 11.2 | 1.23 |
| Amount of acidic group of acid form | 495 | 495 | 495 | 495 | 495 | 495 | 736 | 695 | 118 | 82 | 290 |
| Content of surfactant | 1.0 | 1.0 | 1.0 | 1.0 | 1.0 | 1.0 | 1.0 | 1.0 | 1.0 | 1.0 | 1.0 |

| | Reaction liquid No. | | | | | | | | | | |
|---|---|---|---|---|---|---|---|---|---|---|---|
| | 12 | 13 | 14 | 15 | 16 | 17 | 18 | 19 | 20 | 21 | 22 |
| Glutaric acid | 2.7 | 2.7 | 5.0 | 5.0 | | | 5.0 | 5.0 | 5.0 | 5.0 | 5.0 |
| Propionic acid | | | | | 2.7 | | | | | | |
| Magnesium sulfate | | | | | | 2.5 | | | | | |
| Trimethylolpropane | 20.0 | 20.0 | 20.0 | 20.0 | 20.0 | 20.0 | 20.0 | 20.0 | 20.0 | 20.0 | 20.0 |
| Polyethylene glycol | | | | | | | | | | | |
| Glycerol | | | | | | | | | | | |
| Ethyleneurea | | | | | | | | | | | |
| NIKKOL BC-20 | 1.0 | 1.0 | | | | | | | | | 0.8 |
| NIKKOL BO-20 | | | | | | | | | | | |
| NIKKOL BB-20 | | | | | | | | | | | |
| EMALEX 1825 | | | | | | | | | | | |
| EMALEX 1615 | | | | | | | | | | | |
| EMALEX 512 | | | | | | | | | | | |
| NIKKOL BL-21 | | | 1.0 | | 1.0 | | | | | | |
| NIKKOL BT-12 | | | | 1.0 | | 1.0 | | | | | |
| ACETYLENOL E100 | | | | | | | | 1.0 | | | |
| EMALEX CS-30 | | | | | | | | | 1.0 | | |
| NIKKOL BC-10 | | | | | | | | | | 1.0 | |
| Ion-exchanged water | 76.3 | 76.3 | 74.0 | 74.0 | 76.3 | 76.5 | 75.0 | 74.0 | 74.0 | 74.0 | 74.2 |
| pH | 4.0 | 4.6 | 4.0 | 4.0 | 5.7 | 7.5 | 4.0 | 4.0 | 4.0 | 4.0 | 4.0 |
| Amount of KOH | 2.36 | 2.58 | 4.35 | 4.35 | 5.18 | — | 4.35 | 4.35 | 4.35 | 4.35 | 4.35 |
| Amount of acidic group of acid form | 267 | 253 | 495 | 495 | 52 | — | 495 | 495 | 495 | 495 | 495 |
| Content of surfactant | 1.0 | 1.0 | 1.0 | 1.0 | 1.0 | 1.0 | 0.0 | 1.0 | 1.0 | 1.0 | 0.8 |

Evaluation:

The respective inks and reaction liquids obtained above were used to make up sets with the reaction liquid combined with the ink as shown on a left side of Table 4. In the respective sets of Examples 1 to 30, and Comparative Examples 1 to 4 and 6 to 10, a difference between the pH of the reaction liquid and the pH of an equiamount mixture of the ink and the reaction liquid was within 0.1 in a pH region less than 7.0, and so the reaction liquids had buffering ability in an acid region. In Table 4 are shown the mass ratio (times) of the content of the surfactant in each reaction liquid to the total content (total mass) of the pigment and water-soluble resin in the ink and the molar ratio (times) of the amount of the acidic group of the acid form of the organic acid to the amount of the acidic group of the water-soluble resin.

These sets were used to make evaluation under the following conditions. An apparatus obtained by modifying an ink jet recording apparatus (trade name: PIXUS Pro9500; manufactured by Canon Inc.) in which a recording head ejecting a liquid by the action of thermal energy was installed was used to form an image. An ink and a reaction liquid constituting a set were respectively charged into cartridges, the cartridge of the reaction liquid was set at a position of photo magenta, and two cartridges for the ink were provided and set respectively at positions of cyan and red. Recording conditions are as follows. Recording was conducted by one-pass one-way recording in which an image by an arrangement width of ejection orifices of a recording head is recorded only by scanning starting from a home position of the recording head. The reaction liquid was applied to a recording medium by the same pass, and the ink was then applied so as to overlap therewith. In this embodiment, 1/600 inch×1/600 inch is defined as one pixel, and the pixel was divided into four sections of a lattice to apply the reaction liquid and the ink in the following manner. The reaction liquid was applied by zigzag applying 2 droplets to the four-divided sections, and the ink was applied such that 4 droplets were applied to each of the four-divided sections from an ejection orifice corresponding to the red position and 2 droplets were zigzag applied to the four-divided sections from an ejection orifice corresponding to the cyan position, whereby applying 6 droplets in total. In the present invention, AA, A and B in respective evaluation criteria was regarded as an allowable level, and C was regarded as an unallowable level.

Evaluation of Optical Density:

Each set shown in Table 4 was used to form a 1-cm by 2-cm solid image on a recording medium (PB PAPER GF-500; products of Canon Inc.). After 1 hour, a spectrophotometer (Macbeth RD918; manufactured by Macbeth) was used to measure an optical density of the solid image under conditions of a light source: D50 and a visual field: 2°, thereby making evaluation as to the optical density. The evaluation criteria of the optical density is as follows.

Evaluation Criteria in the Case of Black, Cyan and Yellow Solid Images:
A: The optical density was 1.4 or more;
B: The optical density was 1.2 or more and less than 1.4;
C: The optical density was less than 1.2.

Evaluation Criteria in the Case of Magenta Solid Image:
A: The optical density was 1.2 or more;
B: The optical density was 1.1 or more and less than 1.2;
C: The optical density was less than 1.1.

Evaluation of Sticking Suppression:

Each set shown in Table 4 was used to continuously record such a pattern that a solid image was formed on the whole surface of a A4-sized recording medium on 500 sheets of paper. Thereafter, the same set was used to record 6-point Gothic characters. The characters were visually observed, thereby judging whether the ejection stability was lowered by crust caused on an ejection orifice surface of the recording head or not to make evaluation as to sticking suppression. The evaluation criteria of the sticking suppression are as follows.
AA: Disorder was not observed on the characters to suppress sticking;
A: Some disorder was observed on the characters, but the sticking was slight;
B: Disorder was observed on a part of the characters, but the sticking was slight and at an allowable level;
C: Many disorders were observed on the characters, and sticking was not suppressed.

TABLE 4

Constitution of set and evaluation result

| | | | Constitution of set | | | Evaluation result | |
|---|---|---|---|---|---|---|---|
| | | Ink No. | Reaction Liquid No. | Mass ratio [times] | Molar ratio [times] | Optical density | Sticking suppression |
| Example | 1 | 1 | 1 | 0.22 | 15.4 | A | AA |
| | 2 | 2 | 1 | 0.22 | 15.4 | A | AA |
| | 3 | 1 | 2 | 0.22 | 15.4 | A | AA |
| | 4 | 1 | 3 | 0.22 | 15.4 | A | AA |
| | 5 | 1 | 4 | 0.22 | 15.4 | A | AA |
| | 6 | 1 | 5 | 0.22 | 15.4 | A | AA |
| | 7 | 1 | 6 | 0.22 | 15.4 | A | AA |
| | 8 | 3 | 1 | 0.27 | 30.9 | A | AA |
| | 9 | 4 | 1 | 0.27 | 33.0 | B | AA |
| | 10 | 1 | 7 | 0.22 | 22.9 | A | AA |
| | 11 | 1 | 8 | 0.22 | 21.7 | A | AA |
| | 12 | 5 | 9 | 0.27 | 8.2 | A | AA |
| | 13 | 1 | 10 | 0.22 | 2.6 | B | AA |
| | 14 | 1 | 11 | 0.22 | 9.0 | B | AA |
| | 15 | 1 | 12 | 0.22 | 8.3 | A | AA |
| | 16 | 1 | 13 | 0.22 | 7.9 | B | AA |
| | 17 | 6 | 1 | 0.22 | 19.5 | B | AA |
| | 18 | 5 | 1 | 0.27 | 34.4 | A | AA |
| | 19 | 7 | 1 | 0.22 | 11.6 | A | AA |
| | 20 | 8 | 1 | 0.22 | 8.6 | B | AA |
| | 21 | 9 | 1 | 0.22 | 15.4 | A | AA |
| | 22 | 10 | 1 | 0.22 | 15.4 | A | AA |
| | 23 | 11 | 1 | 0.22 | 15.4 | A | A |
| | 24 | 12 | 1 | 0.22 | 15.4 | A | A |
| | 25 | 13 | 1 | 0.22 | 15.4 | A | A |
| | 26 | 14 | 1 | 0.22 | 15.4 | A | A |
| | 27 | 15 | 1 | 0.22 | 15.4 | A | A |
| | 28 | 1 | 14 | 0.22 | 15.4 | A | A |
| | 29 | 1 | 15 | 0.22 | 15.4 | A | A |
| | 30 | 16 | 16 | 0.27 | 4.4 | B | B |
| Comparative Example | 1 | 17 | 1 | 0.22 | 15.4 | A | C |
| | 2 | 18 | 1 | 0.22 | 15.4 | A | C |
| | 3 | 19 | 1 | 0.33 | — | C | AA |
| | 4 | 20 | 1 | 0.22 | 13.2 | C | AA |
| | 5 | 1 | 17 | 0.22 | — | A | C |
| | 6 | 1 | 18 | 0.00 | 15.4 | A | C |
| | 7 | 1 | 19 | 0.22 | 15.4 | B | C |
| | 8 | 1 | 20 | 0.22 | 15.4 | A | C |
| | 9 | 1 | 21 | 0.22 | 15.4 | A | C |
| | 10 | 1 | 22 | 0.18 | 11.6 | A | C |
| | 11 | 1 | Not used | 0.00 | — | C | AA |

Since the pH of the reaction liquid 7 constituting the set of Example 10 was low, corrosion was caused on a part of a member constituting the recording apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-093354, filed Apr. 19, 2011, and 2012-076528, filed Mar. 29, 2012, which are hereby incorporated by reference herein in their entirety.

What is claimed is:

1. A set of an ink and a reaction liquid for ink jet, the set having a combination of an ink comprising a pigment and a water-soluble resin, and a reaction liquid containing no coloring material but comprising a surfactant and having buffering ability in an acid region, wherein
the pigment in the ink comprises a self-dispersible pigment to a particle surface of which an anionic group is bonded directly or through another atomic group, and the weight-average molecular weight of a functional group bonded to the surface of the pigment particle is 1,000 or less,
the water-soluble resin comprises a copolymer having a unit derived from (meth)acrylic acid,
the surfactant in the reaction liquid comprises an ethylene oxide adduct of a higher alcohol selected from the group consisting of a linear primary alcohol, a linear secondary alcohol and an isoalkyl alcohol, and has a HLB value of 13.0 or more as determined by the Griffin method, and the content (% by mass) of the surfactant in the reaction liquid is 0.20 times or more in terms of mass ratio as much as the total content (% by mass) of the pigment and the water-soluble resin in the ink.

2. The set according to claim 1, wherein the content (% by mass) of the water-soluble resin in the ink is 0.25 times or more in terms of mass ratio as much as the content (% by mass) of the self-dispersible pigment.

3. The set according to claim 1, wherein the reaction liquid comprises an organic acid having a carboxy group as a buffer, and the pH of the reaction liquid is 3.5 or more and 5.5 or less.

4. The set according to claim 3, wherein the organic acid having a carboxy group in the reaction liquid has two carboxy groups.

5. The set according to claim 3, wherein the organic acid having a carboxy group in the reaction liquid has an acidic group of an acid form, and the amount (µmol/g) of the acidic group of the acid form is 8.0 times or more in terms of molar ratio as much as the amount (µmol/g) of the carboxy group of the water-soluble resin in the ink.

6. The set according to claim 1, wherein the acid value of the water-soluble resin in the ink is 100 mg KOH/g or more and 180 mg KOH/g.

7. The set according to claim 1, wherein the surface charge amount of the self-dispersible pigment in the ink is 0.20 mmol/g or more.

8. The set according to claim 1, wherein the number of carbon atoms of the higher alcohol in the reaction liquid is 16 or more.

9. An image forming method in which an ink and a reaction liquid are respectively ejected from a recording head of an ink jet system to bring the ink and the reaction liquid into contact with each other on a recording medium, thereby forming an image, wherein the set of the ink and the reaction liquid according to claim 1 is used as the ink and the reaction liquid.

10. The set according to claim 1, wherein a content (% by mass) of the water-soluble resin in the ink is 0.1% by mass or more and 5.0% by mass or less based on the total mass of the ink.

11. The set according to claim 1, wherein a content (% by mass) of the pigment in the ink is 0.1% by mass or more and 15.0% by mass or less based on the total mass of the ink.

12. The set according to claim 1, wherein a content (% by mass) of the surfactant in the reaction liquid is 0.10% by mass or more and 3.5% by mass or less based on the total mass of the reaction liquid.

* * * * *